United States Patent [19]
Pollack

[11] 3,764,807
[45] Oct. 9, 1973

[54] SYSTEM FOR CONVERTING INFRARED INTO SHORTER WAVELENGTH RADIATION

[75] Inventor: Slava A. Pollack, Palos Verdes Estates, Calif.

[73] Assignee: TRW Inc., Redondo Beach, Calif.

[22] Filed: May 4, 1972

[21] Appl. No.: 250,137

[52] U.S. Cl ............ 250/330, 250/83.3 H, 307/88.3, 250/316
[51] Int. Cl. .............................................. G01j 3/02
[58] Field of Search ............... 250/83.3 H, 83.3 HP; 307/88.3

[56] References Cited
UNITED STATES PATENTS

| | | | |
|---|---|---|---|
| 3,675,039 | 7/1972 | Boyd et al. | 250/83.3 HP |
| 3,462,603 | 8/1969 | Gordon | 307/88.3 X |
| 3,614,462 | 10/1971 | Lean et al. | 307/88.3 |
| 3,672,221 | 6/1972 | Weil | 250/83.3 H X |
| 3,508,208 | 4/1970 | Duguay et al. | 250/83.3 HP X |

*Primary Examiner*—Archie R. Borchelt
*Attorney*—Daniel T. Anderson et al.

[57] ABSTRACT

The frequency matched quantum counter principle is used for converting infrared radiation into visible or near visible radiation. The quantum counter or detection screen utilize the properties of atoms which are capable of absorbing infrared signal radiation inducing electronic transition from a ground state to an intermediate state. Furthermore these atoms are capable of being pumped from the intermediate state to an upper state. The return transition of electrons from the upper state to the ground state which occurs with emission of visible or near-visible radiation can then be detected with a photodetector. The pumping of the active atoms of the quantum counter is accomplished by means of a first laser which is made of a material which contains the same atoms as those effective in the quantum counter. The radiation from this first laser may be modulated by a suitable modulator or may be modified or perturbed by an object to be viewed or depicted. For signal generation a second laser can be used in which the radiation is generated by the same active atoms as the quantum counter. By way of example, the active atoms may consist of triply ionized erbium or triply ionized neodynium both in a suitable matrix.

10 Claims, 4 Drawing Figures

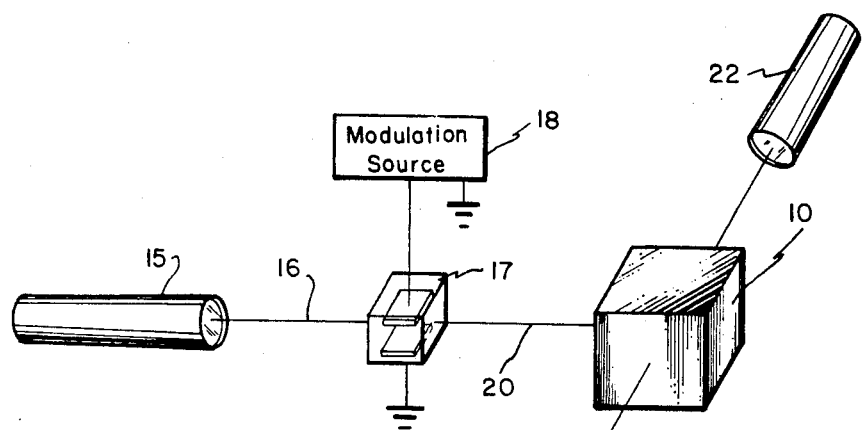
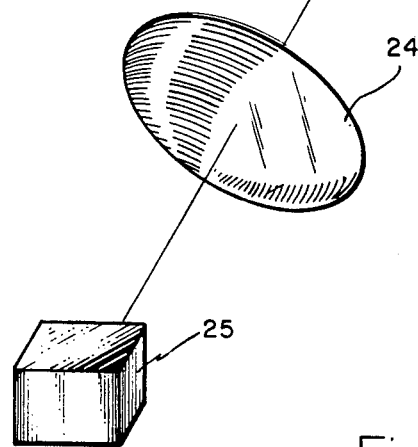
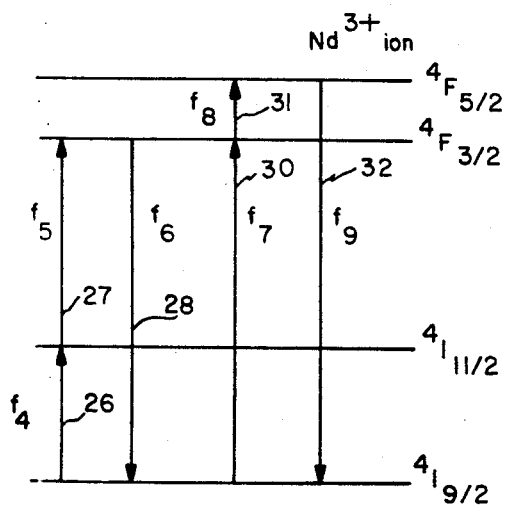
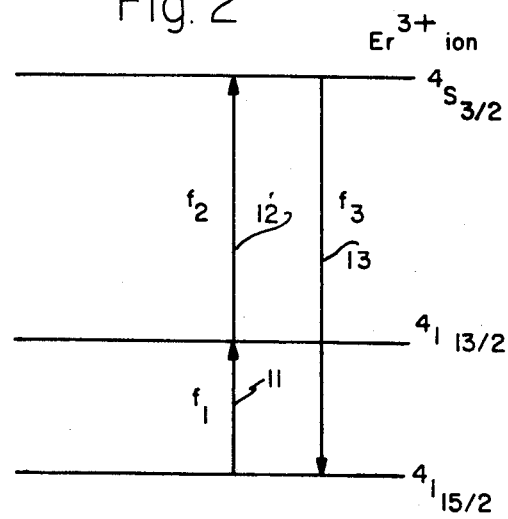

SYSTEM FOR CONVERTING INFRARED INTO SHORTER WAVELENGTH RADIATION

BACKGROUND OF THE INVENTION

This invention relates generally to frequency-matched quantum counters and particularly relates to a system for transforming radiation in the infrared to visible light.

The quantum counter principle for the detection of infrared radiation has been proposed in the past. This principle may be explained as follows. A suitable atom such for example as one of the rare earth ions may be excited by an infrared radiation from its ground state to an intermediate state. The same atom is then pumped to a second excited state from which it returns to the ground state by emitting radiation in the visible or near-visible region. This makes it possible in principle to transform infrared radiation into visible or near-infrared radiation which is usually easier to detect.

In general infrared detectors have a lower signal-to-noise ratio, that is the noise level is usually higher. This is simply due to the fact that the background noise level is higher in the infrared region than in the visible region. Furthermore, detectors for visible light usually are more sensitive than infrared detectors. Many detectors for visible light are known which operate by photoemission. This simply means that the visible light liberates photoelectrons from a photocathode which may subsequently be multiplied in a suitable dinode structure. Such devices are generally known as photomultipliers, and it is well known that they have particularly high signal-to-noise ratios. Accordingly, such photomultipliers are ideally suited for detecting weak radiation in the visible and near visible region.

Accordingly, it would be desirable to provide a system for converting infrared radiation into visible or near visible radiation which can then be detected more efficiently. However, this is very difficult to achieve with a quantum counter of the type outlined herein. The reason is that it is difficult to find a suitable pumping light source of the proper wavelength. In particular, a laser would be ideally suited for such purpose. However, it is well known that the wavelength of the pump and of the modulated infrared signal cannot readily be matched with the available transitions betweeen the enery levels of some quantrum counters. One of the reasons is that the wavelength of the light emitted by a laser is relatively fixed and cannot be varied over a wavelength region to produce a desired wavelength.

It is accordingly an object of the present invention to provide a system for converting infrared radiation into shorter wavelength radiation by the quantum counter principle.

A further object of the invention is to provide a quantum counter which permits to generate both infrared light and pumping light exactly matching that of the active atoms of the quantum counter.

Another object of the present invention is to provide a system of the type discussed which permits to match the wavelength of the signal laser and that of the pumping laser to the required transitions of the active atoms of a quantum counter.

SUMMARY OF THE INVENTION

In accordance with the present invention there is provided a system for converting infrared radiation into shorter wavelength radiation by the quantum counter principle. Thus, the infrared radiation is transformed either into visible light or near infrared light having a shorter wavelength than that of the original infrared radiation. The system comprises a frequency matched quantum counter which includes atoms capable of being excited by infrared radiation from a ground level to an intermediate level. These active atoms are further capable of being pumped from the intermediate level to an upper level whereupon the excited atoms radiate to provide a shorter wavelength radiation by transition from the upper level to the ground state.

There is further provided a first laser for generating the infrared radiation which excites the atoms from the ground state to the intermediate level. The first laser includes as the lasing material the same atoms as those of the quantum counter. There is also provided a second laser for pumping the quantum counter from the intermediate level to the upper level. The second pumping laser also includes as the lasing material the same atoms as those of the quantum counter. Finally some means are provided for observing the shorter wavelength radiation emanating from the quantum counter. This may be done by a camera, the naked eye, or a suitable detector such as a photomultiplier.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a view in perspective of a system for transforming infrared into visible or near-visible radiation and includes a modulator for modulating the infrared beam;

FIG. 2 is an energy level diagram of triply ionized erbium ions which will be referred to in discussing the principles of the invention;

FIG. 3 is an energy level diagram of triply ionized neodymium ions and will be referred to as an alternate material for the system of the invention.

DESCRIPTION OF THE PREFERRED EMBODIMENTS

Figure 4:
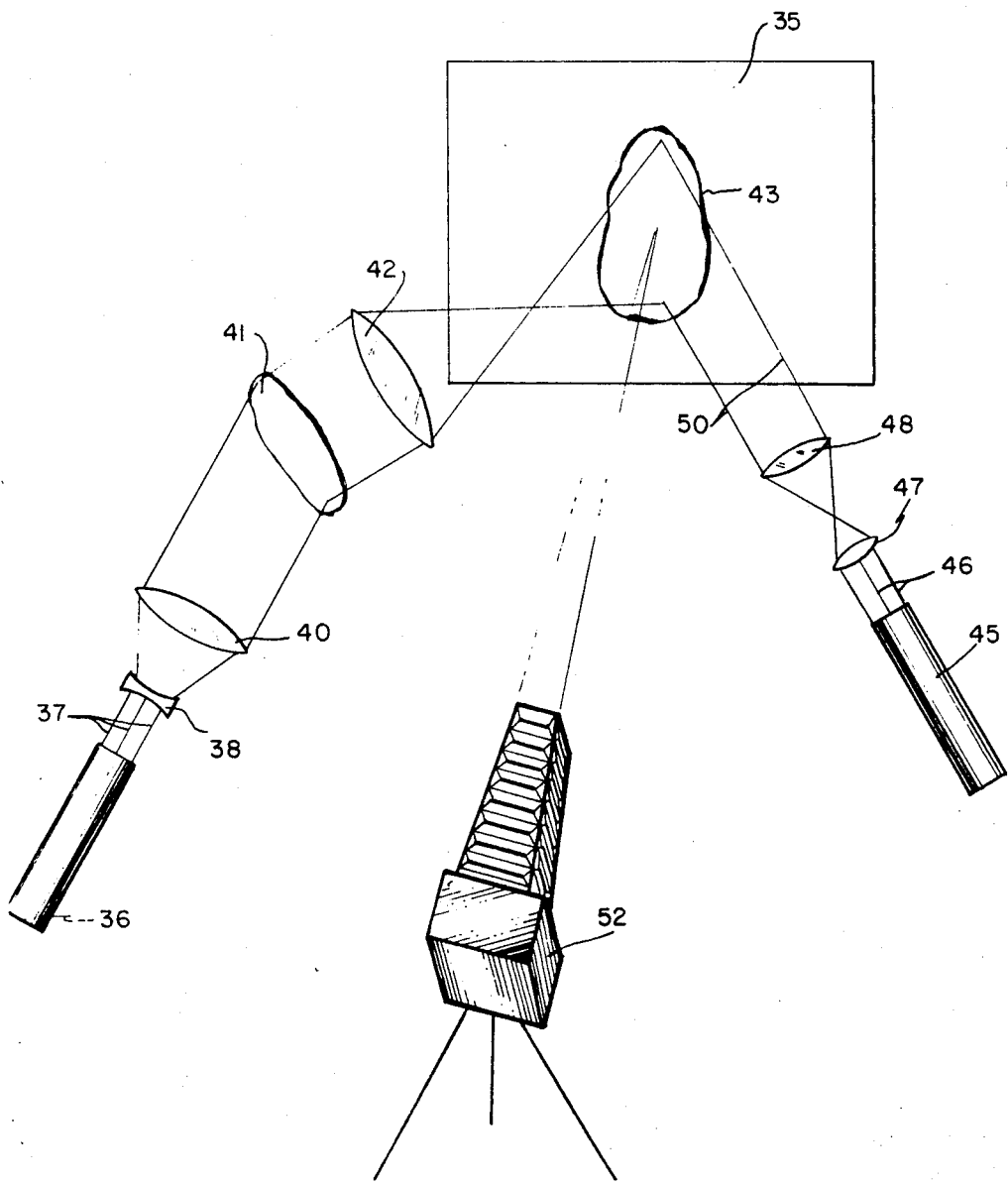
FIG. 4 is a view in perspective of a modified system in accordance with the present invention for generating a visible image of an object irradiated with infrared radiation.

Referring now to the drawings, and particularly to FIG. 1, there is illustrated a system in accordance with the present invention for converting infrared radiation into shorter wavelength radiation such as visible or very near infrared light. The system includes a quantum counter or detector 10. This may include atoms or ions capable of being excited by the infrared radiation from the ground level to an intermediate level. These active atoms or ions are also capable of being pumped from the intermediate level to an upper level so that they are able to radiate shorter wavelength radiation by transition from the upper level to the ground state. By way of example, the detector 10 may include as the active atoms ions of erbium which have been triply ionized ($Er^{3+}$).

The energy diagram of the $Er^{3+}$ ion is shown in FIG. 2 to which reference is now made. FIG. 2 illustrates the ground state or ground level as well as an intermediate and upper level. Thus, the ground state is characterized by $^4I_{15/2}$. In this nomenclature the number 4 indicates a quartet, that is such an energy level is characterized by four closely spaced spectral lines. The letter such as I designates the orbital, angular momentum quantum number and the lower righthand index such as 15/2 indicates the total angular momentum quantum number.

Thus by exciting the triply ionized erbium ion from the ground state by a frequency indicated by $f_1$ the ion will reach the intermediate state. The energy to accomplish this corresponds to 1.6 microns ($\mu$), where 1 micron is $10^{-4}$cm. This is infrared radiation. The erbium ion may now be pumped to an upper level by pumping it with a frequency $f_2$ corresponding to a wavelength of 8,456 angstrom units (A), where one angstrom unit corresponds to $10^{-8}$cm. The erbium ion will now decay from its upper state to the ground state at a frequency $f_3$ corresponding to a wavelength of about 5,400 A.

It should be noted that the pump flux must be strong enough to overcome the decay or natural transition from the intermediate level to the ground state.

Actually the erbium atom must be embedded in a suitable matrix or host material. This may, for example, consist of calcium fluoride ($CaF_2$). However, it will be understood that other host materials may be used instead of calcium fluoride within which the erbium ion is embedded.

Referring again to FIG. 1, there is shown a laser 15 which serves the purpose to generate the frequency $f_1$ corresponding to 1.6 $\mu$. In accordance with the present invention this frequency is generated by a laser having triply ionized erbium ions as the active medium. Thus the laser 15 may consist of the same material of which the detector 10 consists and is operated to generate an infrared radiation of 1.6 microns.

This radiation 16 issues from the laser 15 and impinges on the detector 10 as shown. The radiation may be modulated by a suitable electrooptical modulator 17. This may, for example, consist of a Kerr cell as shown or it may be a Pockels cell or the like. A modulation source 18 is coupled to the electro-optical modulator 17 to modulate it in accordance with a signal. Hence the intensity of the infrared radiation 20 emerging from the electro-optical modulator 17 is modulated and this modulated infrared radiation can be made visible.

To this end there is provided a second laser 22 which may be called the pumping laser. It serves the purpose to excite the triply ionized erbium from the intermediate to the upper level as shown at 12 in FIG. 2. Thus the laser 22 must generate radiation at a wavelength of 8,456 A. Again the pumping laser 22 may consist of the same material as does the detector 10, that is it may consist of triply ionized erbium embedded in a suitable host such as calcium fluoride. Such a laser may be operated to generate the desired frequency at 8,456 A.

The excited triply ionized erbium ion now decays to the ground state as shown by the arrow 13 in FIG. 2 and thereby generates light at the wavelength of about 5,400 A. This light may be collected by a lens 24 which focuses the light on a suitable detector 25 such, for example, as a photo-multiplier 25. Accordingly, the electric signal developed by the photo-multiplier 25 will be modulated in the same fashion as the infrared radiation 20 by the electro-optical modulator 17.

It will be understood that other materials may be used for the detector 10 and the lasers 15 and 22, that is other than triply ionized erbium. For example it has been found that triply ionized neodymium may be used instead. It will also be understood that many other materials are available which have the required properties for the quantum counter 10 and the lasers 15 and 22.

Thus referring to FIG. 3 there is illustrated the energy diagram of $Nd^{3+}$. Thus the triply ionized neodymium may be energized as shown by arrow 26 from the ground level to the first intermediate level. It may then subsequently be energized as shown by arrow 27 from the first to the second intermediate level. The frequency corresponding to arrow 26, that is $f_4$, is 5 $\mu$ while that corresponding to $f_5$, that is, arrow 27 corresponds to 1.06 $\mu$. The atom then decays from its second intermediate level to the ground level by emitting radiation of approximately 9,000 A.

It is also feasible to excite the atom directly by irradiation corresponding to arrow 30 having a frequency $f_7$ of about 9,000 A. It may then be further excited by an infrared radiation as shown by arrow 31 having a frequency $f_8$ of 10 $\mu$. The excited atom then decays from the uppermost level to the ground level as shown by arrow 32 at a frequency $f_9$ corresponding to approximately 8,200 A.

It will be realized that a radiation of 9,000 A is somewhat beyond the visible range but may be termed a near-visible or very near-infrared radiation.

It will be understood that a suitable host material for triply ionized neodymium ion may, for example, be yttrium aluminum garnet. Otherwise neodymium may also be embedded in glass. It will also be appreciated that the wavelength given are somewhat approximate because the lines are relatively broad. This is due to the vibrational motion of the excited atoms or ions which tend to broaden the spectral lines.

Another system in accordance with the present invention is illustrated in FIG. 4 to which reference is now made. This system includes a screen 35 corresponding to the detector 10 of FIG. 1. It may consist of any of the materials previously mentioned. A first laser 36 generates a radiation of a suitable wavelength to excite the active atoms of the screen 35 from a ground to an intermediate level. It may be assumed that the radiation is collimated as shown at 37. This radiation may be enlarged and collimated again by a negative lens 38 followed by a positive lens 40, the two lenses together forming a Galilean telescope. The enlarged and collimated beam may be passed through a suitable object 41. The radiation from the object 41 may be collimated by a lens 42 onto the screen 35 to form an image as shown in 43 of the object 41.

The screen 35 is further illuminated with a laser pump 45. The laser 45 is assumed to generate a collimated beam 46 which may again be passed through a positive lens 47 followed by a larger positive lens 48 to generate a collimated enlarged beam 50 for illuminating the screen 35.

The active atoms or ions of the screen 35, the laser 36, and the laser 45 may be the same and may consist of any of the materials previously memtioned or any other material which has the proper characteristics as previously defined.

Accordingly, a visible image forms at 43 which may, for example, be observed by the eye or alternatively by a camera such as shown at 52. Preferably, for example, the screen 35 may consist of triply ionized erbium atoms embedded in calcium fluoride and the same material may be used for the laser 36 and the pumping laser 45. Thus, an object illuminated with invisible infrared light may be made visible in accordance with the present invention. It should be noted that while FIG. 4 illustrates a transparent object 41 through which the infrared radiation passes, it is also feasible to depict an object not transparent to infrared radiation. In that case the geometry should be such that the infrared light scattered from the object falls on the screen such as 35.

There has thus been disclosed a system for converting infrared radiation into visible or near-visible radiation. This is effected by a quantum counter and by a signal laser and a pump laser, each having as a laserable material the same atoms of which the quantum counter consists. This in turn makes it possible to match exactly the signal and pump frequencies of the atom of the quantum counter to be excited. Preferred materials are triply ionized erbium or neodymium although other materials are possible. The converted shorter wavelength radiation may be detected with improved signal-to-noise ratio. It is also feasible to provide a screen for generating a visible image corresponding to an object irradiated with infrared radiation.

What is claimed is:

1. A system for converting infrared radiation into shorter wavelength radiation by the frequency matched quantum counter principle, said system comprising:
   a. a quantum counter including atoms capable of being excited by infrared radiation from a ground level to an intermediate level and being capable of being pumped from said intermediate level to an upper level, thereby to provide shorter wavelength radiation by transition from the upper level to the ground state;
   b. a first laser for generating an infrared radiation for exciting said atoms from the ground state to an intermediate level, said first laser including as the lasing material the same atoms as those of said quantum counter;
   c. a second laser for pumping said quantum counter from said intermediate level to said upper level, said second pumping laser including as the lasing material the same atoms as those of said quantum counter; and
   d. means for observing the shorter wavelength radiation emanating from said quantum counter.

2. A system as defined in claim 1 wherein the atoms of said quantum counter consist of triply ionized erbium atoms embedded in calcium fluoride and wherein the laserable material of said lasers consists of triply ionized erbium atoms.

3. A system as defined in claim 1 wherein the atoms of said quantum counter consist of triply ionized neodymium atoms embedded in yttrium aluminum garnet and wherein the laserable material of said laser consists of triply ionized neodymium atoms.

4. A system as defined in claim 1 wherein the infrared radiation from said first laser is modulated.

5. A system as defined in claim 1 wherein the infrared radiation from said first laser is modulated by an object to be viewed.

6. An infrared detection system for transforming infrared into visible or near visible radiation, said system comprising:
   a. a detection screen including ionized atoms capable of being energized from a ground level to an intermediate level by infrared light and capable of being energized from said intermediate level to an upper level to generate visible or near-visible light by transition from said upper level to said ground level;
   b. a first laser positioned to illuminate an object to be viewed, and the light perturbed by the object falling on said screen, said first laser including said ionized atoms of said quantum counter as the laserable material and capable of emitting the infrared radiation which excites said ionized atoms from its ground level to its intermediate level;
   c. a second pumping laser positioned to illuminate said screen, said second laser including said ionized atoms as a laserable material and capable of emitting radiation to excite the ionized atoms of said screen from said intermediate to said upper level, whereby said screen will emit visible or near-visible radiation wherever light from said first and second lasers impinges on said screen.

7. A system as defined in claim 6 wherein said ionized atoms consist of triply ionized erbium embedded in calcium fluoride.

8. A system as defined in claim 6 wherein said ionized atoms consist of triply ionized neodymium embedded in yttrium aluminum garnet.

9. A system as defined in claim 6 wherein means are provided for recording the visible image on said screen.

10. An infrared detector system for transforming infrared into visible or near-visible radiation, said system comprising:
    a. a detector including a quantum counter, said counter including atoms capable of being excited by first radiation from a ground level to an intermediate level and being capable of being excited from said intermediate level to an upper level by second radiation, thereby to provide shorter wavelength radiation by transition from the upper level to the ground level;
    b. a first laser;
    c. a second laser, each of said lasers including as a lasing material the same atoms as those of said quantum counter, one of said lasers generating an infrared radiation, the other laser pumping said atoms from one of said levels to a higher level, whereby one of said lasers serves as a pumping laser and the other one is a signal laser; and
    d. means for modulating said signal laser.

* * * * *